US010210151B2

(12) United States Patent
Mingot et al.

(10) Patent No.: US 10,210,151 B2
(45) Date of Patent: Feb. 19, 2019

(54) DYNAMIC FUNCTION BUILDER

(71) Applicant: THOMSON REUTERS GLOBAL RESOURCES UNLIMITED COMPANY, Baar (CH)

(72) Inventors: Frederic Mingot, Paris (FR); Pauline Lateyron-Solignac, Paris (FR); Biljana Janicijevic, Paris (FR); Nicolas Schilt, Puteaux (FR)

(73) Assignee: THOMSON REUTERS (GRC) LLC, New York, NY (US)

( * ) Notice: Subject to any disclaimer, the term of this patent is extended or adjusted under 35 U.S.C. 154(b) by 160 days.

(21) Appl. No.: 14/060,798

(22) Filed: Oct. 23, 2013

(65) Prior Publication Data

US 2014/0173400 A1 Jun. 19, 2014

Related U.S. Application Data

(60) Provisional application No. 61/738,084, filed on Dec. 17, 2012.

(51) Int. Cl.
*G06F 17/30* (2006.01)
*G06F 17/24* (2006.01)

(52) U.S. Cl.
CPC ...... *G06F 17/246* (2013.01); *G06F 17/30861* (2013.01)

(58) Field of Classification Search
CPC ............ G06F 17/246; G06F 17/30864; G06F 17/243; G06F 17/2795; G06F 17/30654; G06F 17/30893; G06F 17/30861
See application file for complete search history.

(56) References Cited

U.S. PATENT DOCUMENTS

| | | | | |
|---|---|---|---|---|
| 6,138,130 A | * | 10/2000 | Adler et al. | 715/210 |
| 6,779,151 B2 | * | 8/2004 | Cahill et al. | 715/210 |
| 6,988,241 B1 | * | 1/2006 | Guttman et al. | 715/220 |
| 7,392,238 B1 | * | 6/2008 | Zhou et al. | |
| 8,239,751 B1 | * | 8/2012 | Rochelle et al. | 715/220 |
| 8,589,869 B2 | * | 11/2013 | Wolfram | 717/109 |
| 2005/0289124 A1 | * | 12/2005 | Kaiser et al. | 707/3 |

(Continued)

FOREIGN PATENT DOCUMENTS

WO 2014/093831 A2 6/2014
WO 2014/093831 A3 8/2014

OTHER PUBLICATIONS

International Search Report and Written Opinion received for International Patent Application Serial No. PCT/US2013/075028 dated May 27, 2014, 8 pages.

(Continued)

*Primary Examiner* — Wilson W Tsui
(74) *Attorney, Agent, or Firm* — Katy Chan-Parsons

(57) ABSTRACT

Systems and techniques are disclosed for dynamically generating functions. The systems and techniques may be utilized to access and display information from a data store accessible to a spreadsheet-based application or program over a network. A web service is also provided that interprets data requests received from the spreadsheet-based application or program in one format, such as a natural language format, and translates the requests into syntactically correct functions with parameters for automatic execution by the spreadsheet-based application or program.

16 Claims, 5 Drawing Sheets

(56) References Cited

U.S. PATENT DOCUMENTS

| | | | |
|---|---|---|---|
| 2006/0069696 A1 | 3/2006 | Becker et al. | |
| 2006/0129932 A1 | 6/2006 | Weber et al. | |
| 2006/0131383 A1* | 6/2006 | Battagin et al. | 235/377 |
| 2006/0282818 A1* | 12/2006 | DeSpain | 717/109 |
| 2008/0066052 A1* | 3/2008 | Wolfram | G06F 8/30 |
| | | | 717/109 |
| 2008/0126465 A1* | 5/2008 | Delaney | G06Q 40/00 |
| | | | 708/490 |
| 2009/0055733 A1 | 2/2009 | Graeber | |
| 2009/0112787 A1* | 4/2009 | Ginzberg | 706/47 |
| 2009/0125796 A1 | 5/2009 | Day et al. | |
| 2009/0235154 A1* | 9/2009 | Khen | G06F 9/541 |
| | | | 715/219 |
| 2012/0151315 A1 | 6/2012 | Campbell et al. | |
| 2013/0125094 A1* | 5/2013 | Wolfram | G06F 8/30 |
| | | | 717/109 |
| 2014/0136936 A1* | 5/2014 | Patel et al. | 715/212 |

OTHER PUBLICATIONS

International Preliminary Report on Patentability received for International Patent Application Serial No. PCT/US2013/075028 dated Jun. 25, 2015, 8 pages.

* cited by examiner

```xml
<functionKeyword>
  <keyword name="default" keyword_parameter_type="" function="Rdata"
      function_fields="CF_NAME,CF_TICK,CF_LAST,CF_NETCHNG,PCTCHNG,CF_CLO
    SE,CF_CURR,RI.R.ASSETCATEGORYDESCRIPTION"
      request_parameter="RTFEED:IDN" refresh_parameter="" RH="In" CH="Fd"
      description="">default</keyword>
  <keyword name="date" keyword_parameter_type="" function="Rhistory"
      function_fields="" request_parameter="INTERVAL:1D" refresh_parameter=""
      RH="" CH="Fd" description="">date</keyword>
  <keyword name="index" keyword_parameter_type="instrument" function="Rdata"
      function_fields="CF_NAME,CF_TICK,CF_LAST,CF_NETCHNG,CF_CLOSE,CF_CU
    RR" request_parameter="" refresh_parameter="" RH="In" CH="Fd"
      description="Provide basic value like name, price, direction, curency, for
    each contituent of the specified index">index</keyword>
  <keyword name="SP500" keyword_parameter_type="instrument" function="Rdata"
      function_fields="CF_NAME,CF_TICK,CF_LAST,CF_NETCHNG,CF_CLOSE,CF_CU
    RR" request_parameter="" refresh_parameter="" RH="In" CH="Fd"
      description="">SP500</keyword>
  <keyword name="CAC40" keyword_parameter_type="instrument" function="Rdata"
      function_fields="CF_NAME,CF_TICK,CF_LAST,CF_NETCHNG,CF_CLOSE,CF_CU
    RR" request_parameter="" refresh_parameter="" RH="In" CH="Fd"
      description="">CAC40</keyword>
  <keyword name="revenue" keyword_parameter_type="sns_field" function="Rdata"
      function_fields="rf.is.revenue" request_parameter="FP:FY2011;FY2012 NP:QP"
      refresh_parameter="" RH="In" CH="Fpa" description="Is used for industrial and
    utility companies. It consists of revenue from the sale of merchandise,
    manufactured goods and services, and the distribution of regulated energy
    resources, depending on a specific company's industry">revenue</keyword>
  <keyword name="utility cash flow" keyword_parameter_type="model" function=""
      function_fields="" request_parameter="" refresh_parameter="" RH="" CH=""
      cell="'[Fundamentals - Utility Cash Flow.xls]Cash Flow Statement -
    Annual'!$B$3#####'[Fundamentals - Utility Cash Flow.xls]Cash Flow
    Statement - Interim'!$B$3" file="trd://Thomson Reuters/Fundamentals -
    Utility Cash Flow.xls" description="Utility cash flow model">utility cash
    flow</keyword>
  <keyword name="utility income statement model"
      keyword_parameter_type="model" function="" function_fields=""
      request_parameter="" refresh_parameter="" RH="" CH="" cell="'[Fundamentals -
    Utility Income Statement.xls]Income Statement -
    Annual'!$B$3#####'[Fundamentals - Utility Income Statement.xls]Income
    Statement - Interim'!$B$3" file="trd://Thomson Reuters/Fundamentals -
    Utility Income Statement.xls" description="Utility income statement
    model">utility income statement</keyword>
  <keyword name="peer analysis" keyword_parameter_type="model" function=""
      function_fields="" request_parameter="" refresh_parameter="" RH="" CH=""
      cell="'[Peer Analysis.xlsx]Sheet1'!$A$3:$B$3" file="trd://Thomson
    Reuters/Peer Analysis.xlsx" description="Peer analysis model">peer
    analysis</keyword>
</functionKeyword>
```

FIG. 3

DYNAMIC FUNCTION BUILDER

CROSS-REFERENCE TO RELATED APPLICATIONS

This application claims priority to U.S. Provisional Application No. 61/737,430 filed Dec. 14, 2012, entitled 'DYNAMIC FUNCTION BUILDER', the content of which is incorporated herein in its entirety.

TECHNICAL FIELD

This disclosure relates to building functions, and more particularly to dynamically building spreadsheet functions to access and display information.

BACKGROUND

Today, spreadsheet-based applications and programs, collectively referred herein as 'spreadsheets', are increasingly being utilized by people to interact with large amounts of data. Spreadsheets arrange data in rows and columns that define spreadsheet cells. Typically, spreadsheet cells allow a user to build functions which may include references to other cells, formulas, lists, as well as user-defined functions. As such, by providing the ability to specify functions in spreadsheets, spreadsheets have become a powerful tool for analyzing a wide range of data.

Building a spreadsheet function, however, is not an easy task. Typically, a user is required to remember a formula name and arguments, and/or memorize objects that are to be included in the function. Such technical requirements are further complicated when the user desires to access to data external to the spreadsheet. Accordingly, building a function can be slow and tedious work and often prevents a user from successfully completing their task.

Some spreadsheets utilize a "Function Wizard" to assist with building functions. Typically, a Function Wizard assists the user with entry of function parameters but does not allow the user to enter functions directly into spreadsheet cells. Thus, while assisting the user with certain aspects of function construction, Function Wizards only assist the user after proper syntax for a function has been manually entered. Consequently, Function Wizards associated with current spreadsheets neither free the user from the difficult task of remembering and entering proper function syntax and parameters nor assist the user in the construction of a function in its entirety.

Accordingly, there is a need for improved systems and techniques for building functions.

SUMMARY

Systems and techniques are disclosed for dynamically generating functions. The systems and techniques may be utilized to access and display information from a data store accessible to a spreadsheet-based application or program over a network. A web service is also provided that interprets data requests received from the spreadsheet-based application or program in one format, such as a natural language format, and translates the requests into syntactically correct functions for automatic execution by the spreadsheet-based application or program.

Various aspects of the invention relate to identifying at least one keyword included in a request and generating an executable instruction based on the request.

For example, according to one aspect, a computer-implemented method for querying information includes obtaining, from a spreadsheet-based program, a data request in a first format, the first format being a natural language format, transmitting, from the spreadsheet-based program to a web service, the data request in the first format, and identifying, from the data request in the first format, at least one keyword. The method also includes comparing the at least one keyword to a data set of pre-defined keyword values, dynamically generating an executable instruction for the spreadsheet-based program in response to the comparison, and transmitting, from the web service and to the spreadsheet program, the generated instruction for execution.

In one embodiment, the generated instruction is automatically executed by the spreadsheet-based program. The generated instruction may invoke a market data platform to access a set of information, such as financial information. The method may also include displaying the set of accessed information in the spreadsheet-based program.

A system, as well as articles that include a machine-readable medium storing machine-readable instructions for implementing the various techniques, are disclosed. Details of various implementations are discussed in greater detail below.

Additional features and advantages will be readily apparent from the following detailed description, the accompanying drawings and the claims.

BRIEF DESCRIPTION OF THE DRAWINGS

FIG. 3 illustrates example keywords for use with the system of FIG. 1.

Like reference symbols in the various drawings indicate like elements.

DETAILED DESCRIPTION

Figure 1:
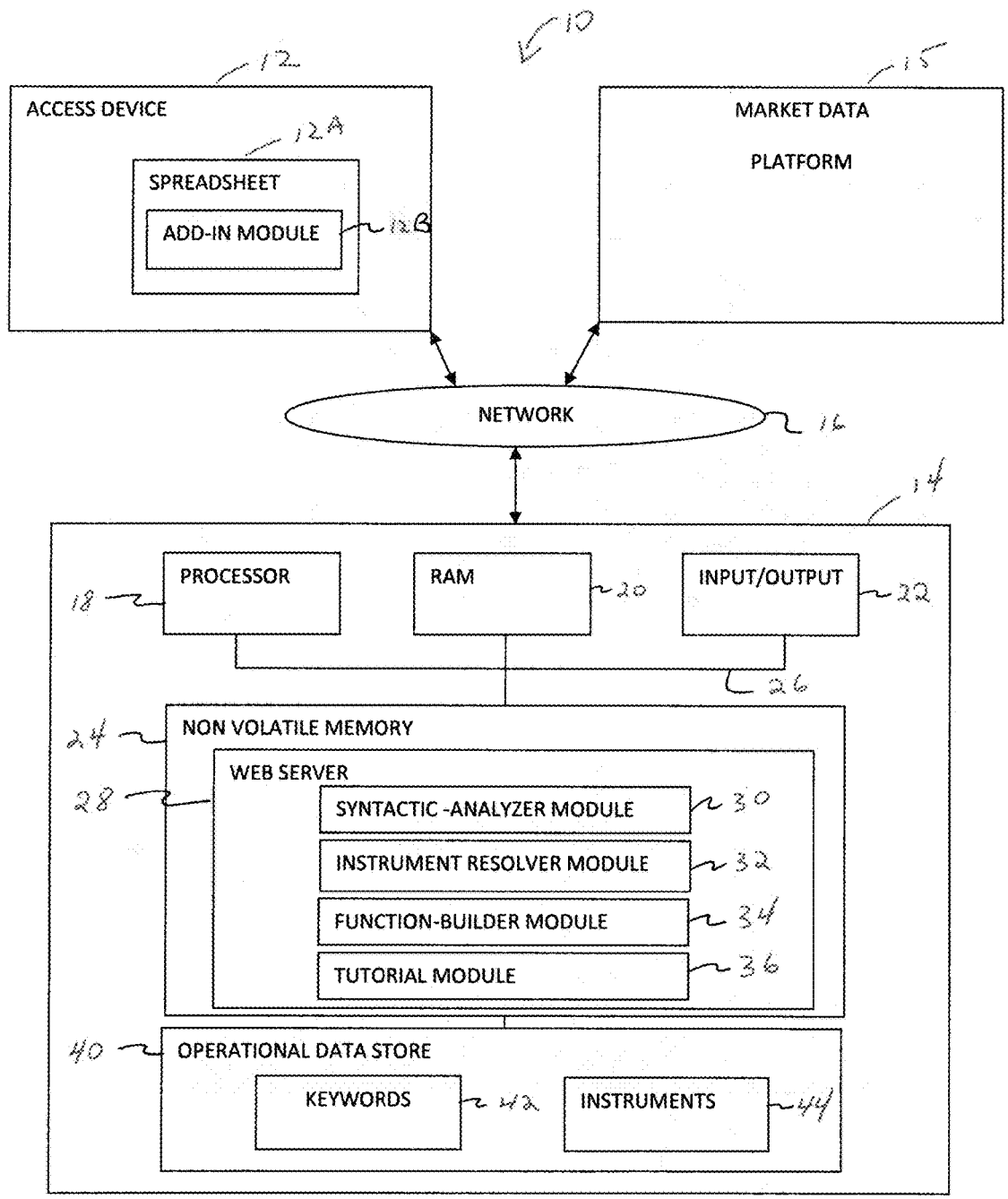
FIG. 1 is a schematic of an exemplary computer-based system for requesting and displaying information using a spreadsheet-based program and a web service.

FIG. 1 is a schematic of an exemplary computer-based system 10 for requesting and displaying information using spreadsheet software, hereinafter referred to as a spreadsheet. Example spreadsheets include, but are not limited to, VisiCalc®, Lotus 1-2-3®, Microsoft Excel®, and other spreadsheet-based programs and applications. The system 10 is configured to include an add-in module to the spreadsheet that manages end-user requests. A web service is also included that decodes natural language end-user requests and provides executable instructions based on such requests for execution in the spreadsheet.

In one embodiment, as shown in FIG. 1, the system 10 is configured to include an access device 12 that is in communication with a server 14 and a market data platform 15 over a network 16. The access device 12 may include a personal computer, laptop computer, or other type of electronic device, such as a cellular phone or Personal Digital Assistant (PDA). In one embodiment, for example, the access device 12 is coupled to I/O devices (not shown) that include a keyboard in combination with a pointing device such as a mouse for sending web page requests to the server 14. Preferably, memory of the access device 12 is configured to include a spreadsheet 12A that includes an add-in module 12B which is used to request and receive information from the server 14. Although only one access device 12 is shown in FIG. 1, the system may support multiple access devices.

The market data platform 15 is configured to provide information to the access device 12 relating to equities, commodities and energy, fixed income, foreign exchange and money market data. In one embodiment, the market data platform 15 also provides effective compliance and risk management, investment management, wealth management solutions, and financial models. The type of data may be historical data, real-time data (e.g., information that is delivered immediately after collection, and fundamentals data. One example of the market data platform is the Thomson Reuters Eikon® product.

The network 16 may include various devices such as routers, servers, and switching elements connected in an Intranet, Extranet or Internet configuration. In some embodiments, the network 16 uses wired communications to transfer information between the access device 12 and the server 14. In other embodiments, the network 16 employs wireless communication protocols. In yet other embodiments, the network 16 employs a combination of wired and wireless technologies.

As shown in FIG. 1, in one embodiment, the server device 14 preferably includes a processor 18, such as a central processing unit ('CPU'), random access memory ('RAM') 20, input-output devices 22, such as a display device (not shown) and keyboard (not shown), and non-volatile memory 24, all of which are interconnected via a common bus 26 and controlled by the processor 18. As shown in the FIG. 1 example, in one embodiment, the non-volatile memory 24 is configured to include a web server 28 for processing requests from the access device 12.

The web server 28 is configured to send syntactically correct spreadsheet function instructions to the add-in module 12B of the access device 12 in response to a request. As noted previously, the request may be in the form of a natural language description. The web server 28 may communicate with the add-in module 12B using one or more communication protocols, such as HTTP (Hyper Text Markup Language). In one embodiment, the web server 28 is configured to include the Java 2 Platform, Enterprise Edition (J2EE').

The web server 28 provides a run-time environment that includes software modules for dynamically generating spreadsheet cell functions. As shown in the FIG. 1 example, in one embodiment, the run-time environment includes a syntactic-analyzer module 30, an instrument-resolver module 32, a function-builder module 34, and a tutorial module 36.

The syntactic-analyzer module 30 analyzes user expressions for keyword names and then correlates the identified keyword names to pre-defined function names that are transmitted to the function-builder module 34 for function generation. The user expression may be received from the add-in module 12B or other functional modules included in the system 10 and may be based in a natural language format, such as a spoken language. In one embodiment, user expressions are passed to the syntactic-analyzer module 30 for analysis as arguments of an HTTP request transmitted from the add-in module 12B.

The instrument-resolver module 32 analyzes user expressions to determine financial instrument codes that may be associated with expressions. Example financial industry codes determined by the instrument-resolver module 32 include, but are not limited to Reuters Industry Codes (RICs). In one embodiment, the instrument-resolver module 32 employs table-lookup and fuzzy logic techniques to correlate at least a portion of a user expression with one or more financial industry codes stored in an instruments data store 44. The one or more financial industry codes are then transmitted to the function-builder module 34 for function generation. For example, the instrument-resolver module 32 may identify the RIC code 'WMT.N' based on a user expression including the phrase 'Wal-Mart on the New York Stock Exchange'.

In one embodiment, the syntactic-analyzer module 30 transmits at least a portion of the user expression to the instrument-resolver module 32 for analysis. Of course, it will be appreciated by one skilled in the art that other means may be used to transmit at least a portion of the user expression. For example, in another embodiment, the function-builder 34 transmits at least a portion of the user expression to the instrument resolver module 32 for analysis. In yet other embodiments, the instrument-resolver module 32 receives the user expression from the add-in module 12B.

The function-builder module 34 dynamically generates functions by combining the results of the syntactic-analyzer module 30 and the instrument resolver module 32. In one embodiment, upon receiving the user expression from the add-in module 12B via an HTTP request, the function-builder module 34 initiates both the syntactic-analyzer module 30 and the instrument-resolver module 32. The function-builder module 34 then combines the results of the modules 30, 32 into an executable spreadsheet instruction which is transmitted to the add-in module 12B using an HTTP response.

Figure 4A:
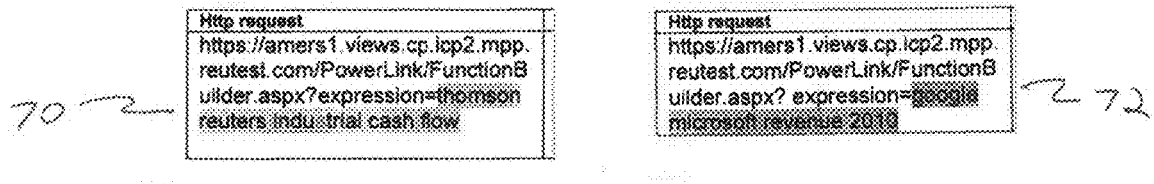
FIG. 4A illustrates example HTTP requests received in the system of FIG. 1.

FIG. 4A illustrates example HTTP requests that may be received by the function-builder module 34. As shown in FIG. 4A, HTTP requests may include user expressions that reference pre-defined models and/or specific functions. In the first example shown in FIG. 4A, the HTTP request includes a reference to access a pre-existing financial model 70 ('thomson reuters industrial cash flow'). In the second example shown in FIG. 4A, the HTTP request includes a reference to data items 72 ('google microsoft revenue 2010').

Figure 4B:
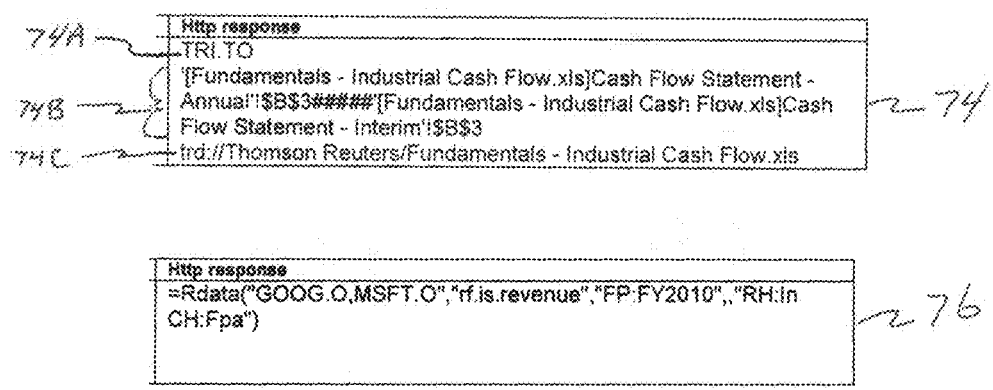
FIG. 4B illustrates example HTTP responses to the HTTP requests shown in FIG. 4A.

FIG. 4B illustrates example HTTP responses generated by the function-builder module 34 in response to receiving the example HTTP requests shown in FIG. 4A. In one embodiment, as shown in the FIG. 4B example, if the user expression results in a determination that a financial model is being requested 74, the function-builder module 34 generates an HTTP response comprising at least three (3) lines of executable code for the spreadsheet 12A based at least in part on results from the syntactic-analyzer module 30 and the instrument-resolver module 32. As shown in the FIG. 4B example, the first line of code 74A constructed by the function-builder module 32 may specify any determined RIC code(s) related to the expression. The second line of code 74B generated by the function-builder module 34 is a list of cell references for pasting any relevant RIC code(s) in the spreadsheet program 12A. In one embodiment, cell references are separated by delimiters, such as '######' if multiple spreadsheet cells are to be updated. The third line of code 74C generated by the function-builder module 34 is a location path to access the requested model. The requested model may be stored on the access device 12 or alternatively, on the market data platform 15 or server 14.

As shown in the FIG. 4B examples, if the user expression included in the HTTP request results in a determination that a particular function is being requested, the function-builder module 34 generates an HTTP response comprising at least one line of executable native spreadsheet code 76 based at least in part on results from the syntactic-analyzer module 30 and the instrument-resolver module 32.

The tutorial module 36 provides end-user guidance on use of the system. In one embodiment, the tutorial module 36 is configured to provide a context sensitive reference list of keywords supported by the system with keyword descriptions. The reference list of keywords may be dynamically generated and transmitted to the access device via HTTP responses and/or be HTML formatted.

As shown in FIG. 1, the system 10 includes an operational data store 40 that includes a keyword data store 42 and an instruments data store 44. The keyword data store 42 stores pre-defined keyword values that may be used in function generation. Keywords may include, but are not limited to, fundamental and real time data fields, dates, functions, models, and mathematical expressions. In one embodiment, pre-defined keywords are stored in the keyword data store 42 in an eXtensible Markup Language (XML) document. An example XML document 80 including a set of pre-defined keywords is shown in connection with FIG. 3. In another embodiment, pre-defined keywords are stored in meta-data files accessible to the access device 12.

The instruments data store 44 stores financial instrument codes that are used to identify financial instruments and indices. For example, in one embodiment, the instruments data store 44 includes a set of RICs, which may be used for querying information on various Thomson Reuters financial information networks. In one embodiment, the operational data store 40 is a relational database. In another embodiment, the operational data store 40 is a directory server, such as a Lightweight Directory Access Protocol ('LDAP') server. In yet another embodiment, the operational data store 40 is a configured area in the non-volatile memory 24 of the device server 14. Although the operational data store 40 shown in FIG. 1 is connected to the network 16, it will be appreciated by one skilled in the art that the operational data store 40 may be distributed across various servers and be accessible to the server 14 over the network 16. Alternatively, the operational data store 40 may be coupled directly to the server 14.

It should be noted that the system 10 shown in FIG. 1 is one embodiment of the disclosure. Other system embodiments of the disclosure may include additional structures that are not shown, such as secondary storage and additional computational devices. In addition, various other embodiments of the disclosure may include fewer structures than those shown in FIG. 1.

Figure 2:
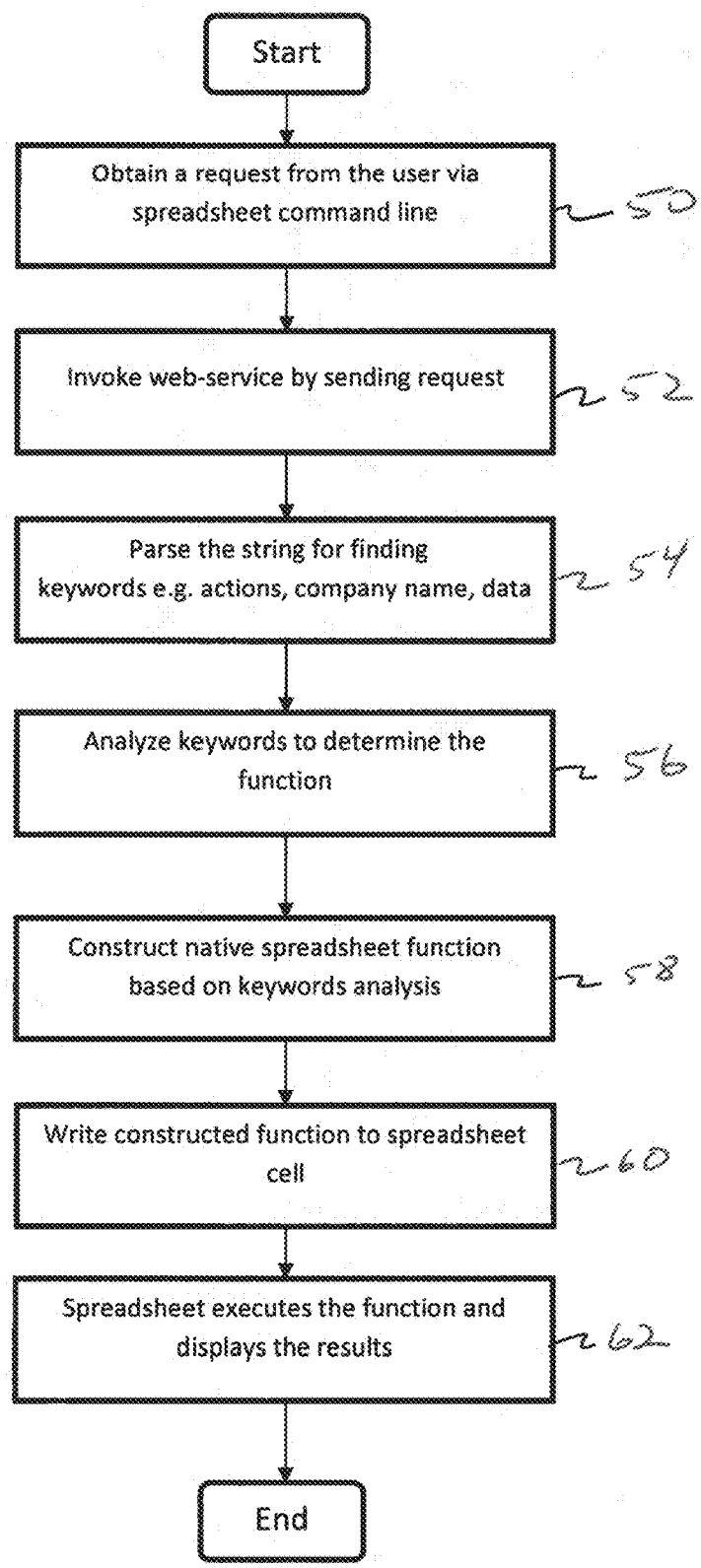
FIG. 2 illustrates an example method of requesting and displaying information using the system shown in FIG. 1.

Turning now to FIG. 2, an example method of requesting and obtaining information according to one embodiment of the disclosure is disclosed. As shown in the FIG. 2 example, at step 50, a request is received from a user. The request may be in the form of a HTTP request that includes a user expression. In one embodiment, the add-in module 12B provides a specific text edit box that allows an end-user to type in the user expression. The user expression may include natural language and be associated with current, historical, or real-time data, date reference data, as well as actions relating to fundamental and financial models, such as accounting models, peer-analysis models, ratio models, and the like. Next, at step 52, upon entering the request, the add-in module 12B transmits the request to the web server 28, which thereby invokes the function-builder module 34.

The function-builder module 34, at step 54, parses the user expression included in the request, which in one embodiment is in the form of a string of characters, and identifies portions of the expression that may be analyzed by the syntactic-analyzer module 30 and the instrument-resolver module 32.

Next, at step 56, possible keywords included in the user expression are determined. In one embodiment, the function-builder module 34 transmits those portions of the user expression that may comprise keywords to the syntactic-analyzer module 30 for analysis. The syntactic-analyzer module 30 in turn compares the possible keywords to the pre-defined keywords stored in the keyword data store 42. If there is a match between a possible keyword and a pre-defined keyword, additional parameters associated with the pre-defined keywords, as shown in connection with FIG. 3, are returned as results to the function-builder module 34. These parameters may include commands written in a native spreadsheet language that are executable by the spreadsheet 12A.

For those portions of the user expression that may relate to a financial asset, such as a bond, stock, currency, futures contract, company name, etc., the function-builder module 34 transmits those portions of the user expression to the instrument-resolver module 32. Similar to the syntactic-analyzer module 30, the instrument-resolver module 32 compares potential financial asset names included in the user expression to pre-defined financial asset identifiers stored in the instruments data store 44. The match may be based on table-lookup and/or fuzzy logic techniques. In one embodiment, if the instrument-resolver module 32 determines a match exists between the potential financial asset and a pre-defined financial asset identifier, the instrument-resolver module 32 transmits a corresponding RIC code associated with the pre-defined financial asset identifier to the function-builder module 34.

Once results from the syntactic-analyzer module 30 and the instrument-resolver module 32 are transmitted to the function-builder module 34, at step 58, the function-builder module 34 dynamically generates a response to the request. In one embodiment, the response is an HTTP response that includes a combination of results from the syntactic-analyzer module 30 and the instrument-resolver module 32 in the form of a native spreadsheet function. Once the native spreadsheet function is generated, the function-builder module 34 transmits the response to the add-in module 12B. At step 60, upon receiving the response, the add-in module 12B copies the generated instruction to at least one spreadsheet cell. Lastly, at step 62, upon the generated instruction being copied to the at least one spreadsheet cell, the spreadsheet 12A executes the generated native language function.

Figure 5A:
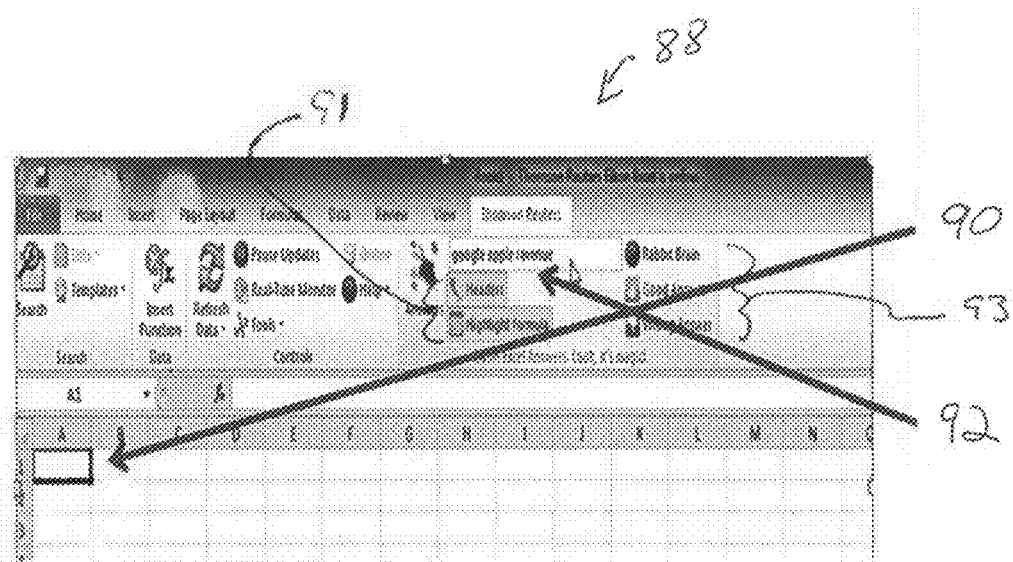
FIGS. 5A-B illustrate an example graphical user interface for use with the system shown in FIG. 1.
Figure 5B:
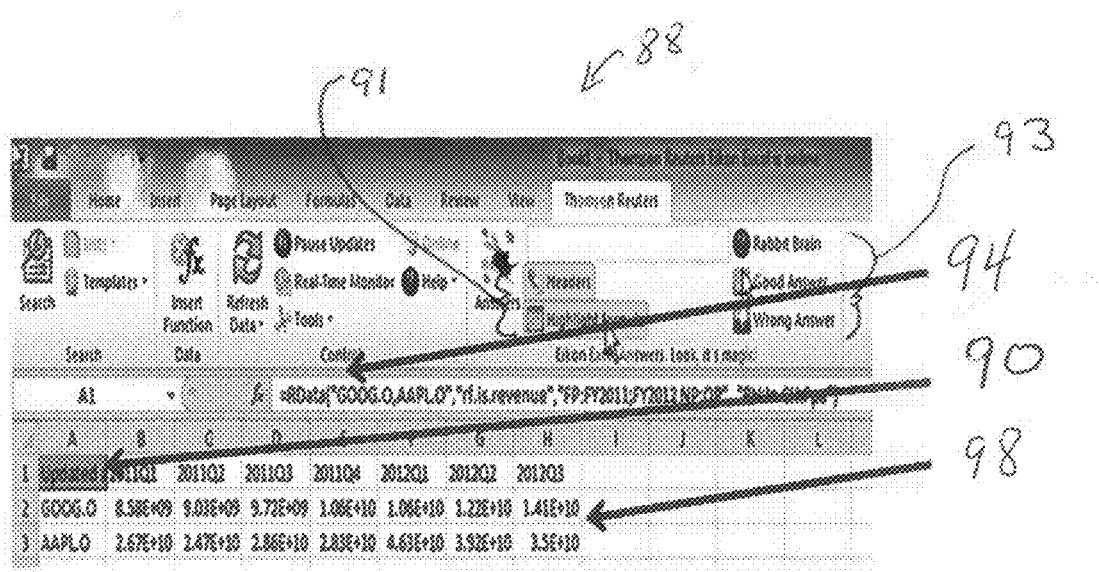

Referring now to FIGS. 5A-B, in one embodiment, an example graphical user interface (GUI) 88 is disclosed that may be used in connection with the system shown in FIG. 1. As shown in FIG. 5A, in one embodiment, the GUI 88 includes at least one spreadsheet cell 90 under the control of the before-mentioned spreadsheet 12A and a text box 92 for the end-user to enter requests under the control of the before-mentioned add-in module 12B. The GUI 88 may also include headers and highlight formula check buttons 91 for use with the spreadsheet 12A, as well as voting buttons 93 that allow the end-user to indicate the accuracy of results returned by the server 14. In one embodiment, based on the accuracy of results indicated by end-users, pre-defined keywords in the system are added to, deleted from, or modified in the system 10. In one embodiment, both the headers and highlight formula check buttons 91 the voting buttons 93 are under the control of the add-in module 12B.

In operation, an end-user first selects one or more cell 90 in the spreadsheet 12A. Next, in the text box 92, which in one embodiment is provided as a command bar, the end-user types a request i.e., natural language, and presses an enter key to validate. The add-in module 12B then generates an HTTP request which is then transmitted to the web server 28. A response to the request is then generated by the system as disclosed in connection with FIG. 2.

Referring to FIG. 5B, in one embodiment, upon receiving an HTTP response, the add-in module 12B extracts the native spreadsheet function from the response 94 and copies the native spreadsheet function to the at least one cell 90. Lastly, the spreadsheet 12A executes the native spreadsheet function and the result is displayed in one or more spreadsheet cells 98.

Various features of the system may be implemented in hardware, software, or a combination of hardware and software. For example, some features of the system may be implemented in one or more computer programs executing on programmable computers. Each program may be implemented in a high level procedural or object-oriented programming language to communicate with a computer system or other machine. Furthermore, each such computer program may be stored on a storage medium such as read-only-memory (ROM) readable by a general or special purpose programmable computer or processor, for configuring and operating the computer to perform the functions described above.

We claim:

1. A computer-implemented method comprising:
   obtaining, from a spreadsheet program comprising spreadsheet cells, a data request in a first format, wherein the data request is a request for one or more financial models and one or more financial data items and the first format being a natural language format, the data request further comprising instructions for a first cell location from one of the spreadsheet cells, the spreadsheet program comprising at least a set of commands;
   transmitting, from the spreadsheet program to a web server, wherein the web server provides a run-time environment that includes one or more modules for dynamically generating spreadsheet cell functions, the data request in the first format;
   identifying, from the data request in the first format, at least one keyword and the one or more financial models;
   comparing the at least one keyword to a data set of pre-defined keyword values;
   generating an executable instruction for the spreadsheet program in response to the comparison, the executable instruction being in a second format different from the first format, wherein the executable instruction comprises a list of references to t h e spreadsheet cells to be updated based on the first cell location and the one or more financial models, and at least one parameter associated with a pre-defined keyword value of the data set of pre-defined keyword values, the at least one parameter comprising commands in native spreadsheet language from the set of commands, the executable instruction being in an executable state for execution by the spreadsheet program; and
   copying the executable instruction to the spreadsheet program;
   executing the executable instruction, said execution further comprises populating the spreadsheet cells referenced in the executable instruction.

2. The method of claim 1, wherein the spreadsheet program is selected from the group consisting essentially of Excel, Lotus 1-2-3, and VisiCalc.

3. The method of claim 1, wherein the executable instruction invokes a market data platform to access a first set of information.

4. The method of claim 3, further comprising displaying the first set of information in the spreadsheet program.

5. The method of claim 1, further comprising:
   identifying, from the data request, at least one financial asset name;
   comparing the at least one financial asset name to a set of pre-defined financial asset identifiers; and
   combining at least one of the set of financial asset identifiers with the instruction based on the comparison of the at least one financial asset name to the set of pre-defined financial asset identifiers.

6. The method of claim 1, wherein the executable instruction is a native spreadsheet function.

7. The method of claim 1, further comprising mapping the executable instruction to at least one spreadsheet cell.

8. A system comprising:
   a non-transitory data repository comprising a set of pre-defined keywords and associated parameters;
   a spreadsheet program comprising spreadsheet cells, wherein the spreadsheet program transmits a data request in a first format, wherein the data request is a request for one or more financial models and one or more financial data items and the first format being a natural language format, the data request further comprising instructions for a first cell location from one of the spreadsheet cells, the spreadsheet program comprising at least a set of commands;
   a web server, wherein the web server provides a run-time environment that includes modules for dynamically generating spreadsheet cell functions the web server further comprising a processor and a memory operatively coupled to the processor, the memory storing instructions that, in response to receiving the data request causes the processor to:
   identify, from the data request in the first format, at least one keyword and the one or more financial models;
   compare the at least one keyword to the set of pre-defined keywords;
   generate an executable instruction for the spreadsheet program in response to the comparison, the executable instruction being in a second format different from the first format, wherein the executable instruction comprises a list of references to the spreadsheet cells to be updated based on the first cell location and the one or more financial models, and at least one parameter associated with a predefined keyword value of a data set of pre-defined keyword values associated with the set of pre-defined keywords, the at least one parameter comprising commands in native spreadsheet language from the set of commands, the executable instruction being in an executable state for execution by the spreadsheet program;
   copy the executable instruction to the spreadsheet program; and execute the executable instruction by the spreadsheet program, said execution further comprises populating the spreadsheet cells referenced in the executable instruction.

9. The system of claim 8, wherein the spreadsheet program is selected from the group consisting essentially of Excel, Lotus 1-2-3, and VisiCalc.

10. The system of claim 8, wherein the memory stores instructions that, in response to receiving the request, cause the processor to access a market data platform to access a first set of information.

11. The system of claim 8, wherein the memory stores instructions that, in response to receiving the request, cause the processor to: identify, from the data request, at least one financial asset name; compare the at least one financial asset name to a set of pre-defined financial asset identifiers; and combine at least one of the set of pre-defined financial asset identifiers with the instruction based on the comparison of the at least one financial asset name to the set of pre defined financial asset identifiers.

12. The system of claim 8, wherein the executable instruction is a native spreadsheet function.

13. A computer device comprising a processor and a memory storing instructions that cause the processor to:
    display a spreadsheet using a spreadsheet program wherein the displayed spreadsheet comprises spreadsheet cells;
    receive a first request at the spreadsheet program;
    generate a second request to a web server in response to receiving the first request from the spreadsheet program, wherein the web server provides a run-time environment that includes modules for dynamically generating spreadsheet cell functions in the spreadsheet program, wherein the second request is for one or more financial models and one or more financial data items and includes an expression in a natural language format, the second request further comprising instructions for a first cell location from one of the spreadsheet cells, the spreadsheet program comprising at least a set of commands; and
    execute a native spreadsheet function, the native spreadsheet function included in a response received from the webserver responsive to the request, wherein the native spreadsheet function is executed in response to an executable instruction comprising a list of references to the spreadsheet cells to be updated based on the first cell location and the one or more financial models, and at least one parameter associated with a pre-defined keyword value of a data set of pre-defined keyword values based on the natural language expression, the at least one parameter comprising commands in native spreadsheet language from the set of commands, said execution further comprises populating and displaying the spreadsheet cells referenced in the executable instruction.

14. The computer device of claim 13, wherein the request is an HTTP request and the response is a HTTP response.

15. The computer device of claim 14, wherein the request is associated with at least one of fundamental data, historical-data, real-time data, dates, models and mathematical expressions.

16. The computer device of claim 13, further comprising a graphical user interface to generate the request and display the response.

* * * * *